(12) United States Patent
Glaue et al.

(10) Patent No.: US 11,456,132 B2
(45) Date of Patent: Sep. 27, 2022

(54) ELECTRICAL SWITCHING DEVICE

(71) Applicant: Siemens Energy Global GmbH & Co. KG, Munich (DE)

(72) Inventors: Andreas Glaue, Berlin (DE); Karsten Juhre, Berlin (DE); Andreas Kleinschmidt, Oranienburg (DE); Mark Kuschel, Berlin (DE); Bernhard Lutz, Berlin (DE); Ingo Seubert, Berlin (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 0 days.

(21) Appl. No.: 17/263,632

(22) PCT Filed: Jun. 27, 2019

(86) PCT No.: PCT/EP2019/067112
§ 371 (c)(1),
(2) Date: Jan. 27, 2021

(87) PCT Pub. No.: WO2020/020562
PCT Pub. Date: Jan. 30, 2020

(65) Prior Publication Data
US 2021/0193415 A1 Jun. 24, 2021

(30) Foreign Application Priority Data
Jul. 27, 2018 (DE) .................... 10 2018 212 581.3

(51) Int. Cl.
*H01H 33/56* (2006.01)
*H02B 13/055* (2006.01)
(Continued)

(52) U.S. Cl.
CPC .......... *H01H 33/56* (2013.01); *B01D 53/002* (2013.01); *B01D 53/70* (2013.01); *H02B 13/055* (2013.01);
(Continued)

(58) Field of Classification Search
CPC ...... H01H 33/56; H01H 33/22; H01H 33/302; H01H 33/365; H01H 2033/566;
(Continued)

(56) References Cited

U.S. PATENT DOCUMENTS 4,278,832 A * 7/1981 Hingorani ............ H02B 13/055
174/14 R
7,816,618 B2 * 10/2010 Uchii ..................... H01H 33/56
218/43
(Continued)

FOREIGN PATENT DOCUMENTS

DE 19837845 C2 9/2002
DE 102015213598 A1 1/2017
(Continued)

OTHER PUBLICATIONS

Translation of DE102015213598 (Original document published Jan. 26, 2017) (Year: 2017).*
(Continued)

*Primary Examiner* — William A Bolton
(74) *Attorney, Agent, or Firm* — Laurence A. Greenberg; Werner H. Stemer; Ralph E. Locher

(57) ABSTRACT

An electrical switching device is provided for interrupting an electrical connection. The device has a switching chamber and two contact pieces being arranged directly in the switching chamber or in an encapsulated housing arranged in the switching chamber and configured to be gas-tight in relation to the switching chamber. The contact pieces are movable relative to each other to bring about a switching
(Continued)

action. A fluid insulation medium is also provided, which is arranged in the switching chamber or in a storage volume which can be connected to the switching chamber. The switching chamber or the storage volume has an outlet for letting out the fluid insulation medium. A filter is provided at or adjacent to the outlet, the filter configured to filter gaseous components of the insulation medium, or the reaction products thereof, conducted through the outlet.

9 Claims, 1 Drawing Sheet

(51) Int. Cl.
*B01D 53/00* (2006.01)
*B01D 53/70* (2006.01)

(52) U.S. Cl.
CPC .. *B01D 2253/102* (2013.01); *B01D 2253/108* (2013.01); *B01D 2257/2066* (2013.01)

(58) Field of Classification Search
CPC .. H02B 13/055; H02B 13/045; B01D 53/002; B01D 53/70; B01B 2253/102; B01B 2253/108; B01B 2257/066
USPC .................................. 218/43, 44, 90, 91, 92
See application file for complete search history.

(56) References Cited

U.S. PATENT DOCUMENTS

| 9,455,562 | B2* | 9/2016 | Piccoz ..................... H02G 7/05 |
| 9,837,801 | B2* | 12/2017 | Kieffel ................ H02B 13/055 |
| 2006/0186091 | A1* | 8/2006 | Rokunohe ............. H01H 33/22 |
| | | | 218/43 |
| 2017/0069407 | A1 | 3/2017 | Johnson et al. |
| 2017/0213673 | A1* | 7/2017 | Elshani ................. H01H 33/56 |

FOREIGN PATENT DOCUMENTS

| JP | 2015073348 | * | 4/2015 | ....... H01H 33/70769 |
| WO | 2015177149 | A1 | 11/2015 | |
| WO | 2017029338 | A1 | 2/2017 | |
| WO | 2017121665 | A1 | 7/2017 | |

OTHER PUBLICATIONS

Translation of JP2015073348 (original document published Apr. 16, 2015) (Year: 2015).*

Michael Ballhorn: "Entwicklung von Polymermembranen fuerdie Abtrennung von Kohledioxid aus Gassstroemen" [Separation of carbon dioxide from gas streams with polymetric membranes], Dissertation, Nov. 16, 2000 Fakultaet fuer Mathematik, Informatik und Naturwissenschaften der Reinisch-Westfaelischen Technischen Hochschule Aachen.

Bettermann et al.: "Membranverfahren zur Auftrennung von gasfoermigen und fluessigen Stoffgemischen" [Membrane process for the separation of gaseous and liquid mixtures of substances], News Analytik, Aug. 19, 2010, vww.analytik-news.de.

* cited by examiner

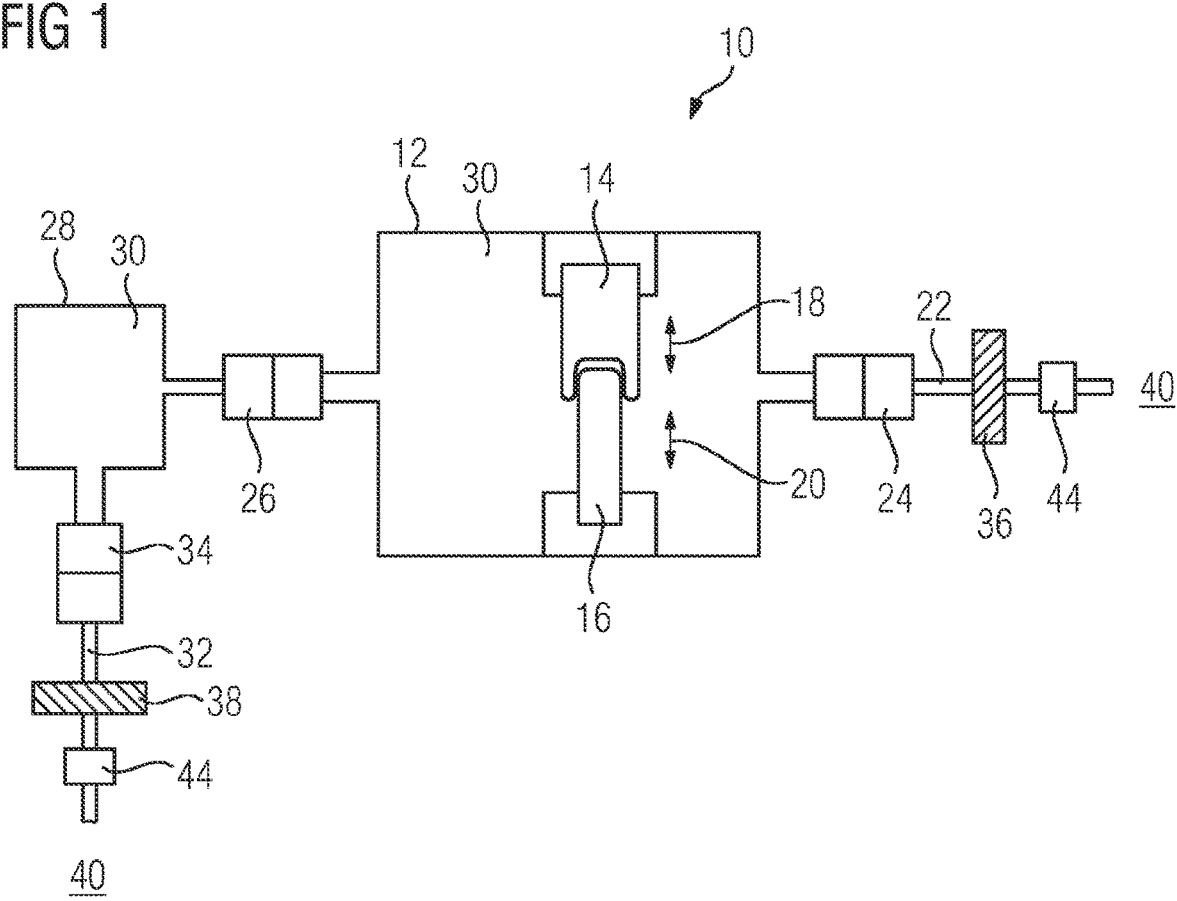
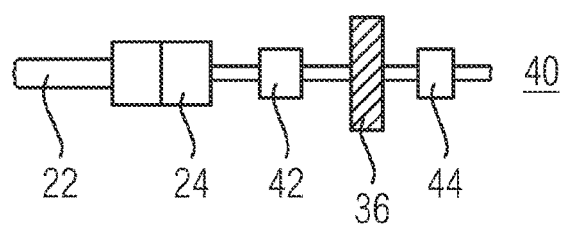

ELECTRICAL SWITCHING DEVICE

BACKGROUND OF THE INVENTION

Field of the Invention

The present invention relates to an electrical, particularly a gas-insulated switching device having an improved release of the insulating medium. The present invention further relates to a method for removing an insulating medium from an electrical, particularly a gas-insulated switching device.

Gas-insulated switching devices based upon $SF_6$-free insulating gases are frequently operated with gas mixtures, which are comprised of one or more carrier gases and special additive substances. The additive substances are, for example, fluorinated compounds, which influence the dielectric properties of the gas mixture in a specific manner. The carrier gases are generally mixtures, comprised predominantly of carbon dioxide, nitrogen and oxygen in specific proportions. During the operation of devices, breakdown products are produced by discharge processes which are potentially toxic, and consequently cannot be released into the environment. Fluorinated compounds contained in gas mixtures can also be harmful to health, the environment or the climate, and consequently should not be permitted to enter the environment. Under certain circumstances, however, it is necessary for the switching device to be drained, for example further to operating malfunctions, in the event of a repair, or for the execution of a scheduled overhaul.

Document WO 2017/029338 A1, for example, describes a method for recovering a substance from an insulating medium of an electrical installation for the generation, transmission, distribution and/or utilization of electrical energy, wherein the insulating medium comprises a fluorinated organic compound and one further component in the gaseous phase. The method comprises the following sequential steps: a) conveyance of an output gas mixture containing the fluorinated organic compound and at least one further component of the insulating medium from an insulating chamber of the electrical device to a substance recovery apparatus, b) liquefaction of the fluorinated organic compound in the substance recovery apparatus by b1) compressing the initial gas mixture, and b2) cooling the compressed initial gas mixture to a temperature at which the fluorinated organic compound is liquefied, and c) separation of the liquefied fluorinated organic compound from the remaining gas, which contains the at least one residual component of the initial gas mixture.

However, known solutions of this type from the prior art still have substantial potential for improvement, particularly with respect to the release of a gas mixture from a switching device which is simple to implement and reliable.

SUMMARY OF THE INVENTION

The object of the present invention is to at least partially surmount the known disadvantages of the prior art. In particular, the object of the present invention is the provision of a solution, by means of which a gaseous insulating medium can be released from a switching device in a simple and environment-friendly manner.

According to the invention, this object is fulfilled by a switching device having the features of claim 1. According to the invention, this object is further fulfilled by a method having the features of claim 10. Preferred configurations of the invention are described in the sub-claims, in the description or in the figures, wherein further features described or represented in the sub-claims or in the description or the figures, either individually or in an arbitrary combination, can constitute the subject matter of the invention, unless explicitly indicated to the contrary by the context.

An electrical switching device is proposed for constituting and interrupting an electrical connection, having a switching chamber, wherein two contact pieces are arranged directly in the switching chamber or in an encapsulation housing which is arranged in the switching chamber and is configured in a gas-tight manner vis-à-vis the switching chamber, wherein the contact pieces are movable relative to one another for the execution of a switching action, wherein a fluid, particularly a gaseous insulating medium is further provided, which is arranged in the switching chamber or in a storage volume which can be connected to the switching chamber, and wherein the switching chamber or the storage volume has an outlet for releasing the fluid insulating medium, wherein a filter is provided on or adjacently to the outlet, which is designed to filter out gaseous constituents of the insulating medium, or the reaction products thereof, which are conveyed through the outlet.

A switching device of this type, in a particularly advantageous manner, provides a solution for the simple and environment-friendly release of a gaseous insulating medium from a switching device.

The present invention thus relates to an electrical switching device. A switching device of this type is known per se, and the particular function thereof is the interruption of electrical lines in which high currents flow. The function of the switching device is thus the constitution and interruption of an electrical connection.

Electrical switching devices include, for example, power circuit-breakers, isolating switches, grounding switches, combined isolating and grounding switches etc. which, in principle, are known e.g. from the prior art.

For example, the switching device is a high-voltage switch, for example a power circuit-breaker. A switching device of this type can thus be appropriate for the conduction of high currents, or for the application of a high voltage, wherein arcing can occur in conjunction with interruption.

Exemplary currents which can be interrupted by a power circuit-breaker of a high-voltage switch can lie within a range of up to 80,000 A. Moreover, voltages in a range of up to 800,000 V can be present on the switching device.

It is correspondingly provided that the switching device has a switching chamber. The switching chamber can be configured for example in a gas-tight manner vis-à-vis the environment, or can be encapsulated. The switching chamber can thus also be enclosed or encapsulated in a gas-tight manner vis-à-vis other spaces in the switching device.

It is further provided that, directly in the switching chamber or in an encapsulation housing which is arranged in the switching chamber and is configured in a gas-tight manner vis-à-vis the switching chamber, two contact pieces are arranged, wherein the contact pieces are movable relative to one another for the execution of a switching action. The contact pieces are correspondingly configured such that the latter can be brought into contact with one another, thus permitting the constitution of an electrical connection. The contact pieces can further be oriented in relation to one another such that an insulating clearance is provided between the contact pieces instead, and the latter are not in contact, such that no current can flow, even at high voltages.

The electrical switching device can correspondingly assume, for example, a first and a second switching state, for example a closed state and an open state. In the first switching state, the contact pieces are in contact with one another and, in the second switching state, an insulating clearance is constituted between the contact pieces.

The contact elements, for example, can thus be directly present in the switching chamber, i.e. in the switching chamber atmosphere. Alternatively, it can be provided that an encapsulation housing is present in the switching chamber, in which the contact pieces are arranged. For example, this encapsulation housing, in combination with the contact pieces, can constitute a vacuum switch.

In an electrical switching device, a fluid, and particularly a gaseous insulating medium is provided. The particular function of the insulating medium, upon the separation of the contact pieces, for example in the event of a high current flow along the latter, is to prevent or reduce arcing, such that any damage to the contact pieces associated with the separation thereof can be prevented, or at least significantly reduced. In particular, the insulating medium is intended to quench an arc which occurs in the switching device which is configured, for example, in the form of a high-voltage switch, in particular upon the separation of the contact elements. The insulating medium can moreover assume the function of ensuring the functionality of the insulating clearance between the contact pieces in a secure and reliable manner, in the second switching state of the switching device. Moreover, insulation between the encapsulation housing and the housing of the switching chamber can be permitted, for example.

For a preferred functionality, the insulating medium is particularly a fluid. It is particularly preferred that the insulating medium is a gas. For example, under the operating conditions of the switching device, the insulating medium can thus be present in a gaseous form, whether in the presence of an overpressure or under unpressurized conditions. It can further be provided that the insulating medium, upon the release thereof from the electrical switching device, is present in the form of a gas, and thus approximately at the ambient pressure such as, for example, 1 bar.

By the provision of a gaseous insulating medium, it can be permitted that the insulating medium is admitted to and remains in an insulating space of the switching device, described as the switching chamber, in a particularly simple manner. As a result, the insulating medium can entirely surround contact elements or contact pieces, between which an arc can occur upon separation, or the insulating medium can optionally surround the encapsulation housing. Thus, in principle, the generation of an arc can be counteracted, or the quenching of the arc can be effectively supported, or an effective insulation between the encapsulation housing and the housing of the switching chamber can be permitted.

In principle, the provision of a gaseous insulating medium is associated with ease of manageability, for example during the introduction thereof into the switching chamber which is constituted in the form of an insulating space, during the retention thereof in the switching chamber and, optionally, in the event of replacement.

Finally, particularly in the case of a gaseous insulating medium, by the constitution of an appropriate overpressure in the switching chamber, the quantity of insulating medium present in the insulating space can be adjusted in a simple manner, such that the dielectric strength can be tailored to the desired field of application.

In principle, the insulating medium can thus be configured in the manner which is known from the prior art. In particular, the insulating medium can comprise a fluorine-based or fluorinated compound, as described in greater detail hereinafter. A fluorine-based or fluorinated compound, in a manner which is known per se, can be understood as a compound of this type which has at least one fluorine atom in its molecular structure.

The insulating medium, for example, can thus be directly present in the switching chamber, such that it is present or is arranged in a manner which directly surrounds the contact pieces. This can also be the case during intended or desired operation such that, in the event of the interruption of the electrical connection, and thus the mutual separation of the contact pieces, the insulating clearance constituted between the contact pieces can be filled directly.

Alternatively or additionally, it can be provided that the insulating medium is arranged in a storage volume which is connectable to the switching chamber. In this configuration, it can thus be provided that the insulating medium, during standard or intended operation, and thus particularly where the contact pieces are in mutual contact, is present in a manner which is exclusive from or additional to the switching chamber. It can thus be provided that the insulating medium is conveyed from the storage volume into the switching chamber, where a switching action to an interrupted switching state is to be executed or is executed. Again, in this configuration, it can be ensured that, in the event of a switching action for the separation of the contact pieces, the contact pieces are surrounded by the insulating medium.

In the switching device described herein, it is further provided that the switching chamber or the storage volume incorporates an outlet for the release of the insulating medium. An outlet of this type can be advantageous, for example, in that it permits the drainage of insulating medium from the switching device, and particularly the release thereof from the switching chamber or the storage volume. This can be highly advantageous on the grounds that, under certain circumstances, it can be necessary for the switching device to be drained, for example further to operating malfunctions, in the event of a repair, or for the execution of a scheduled overhaul. The outlet is thus intended to permit an intentional release of the insulating medium. It will be self-evident that only the switching chamber or else the switching chamber and additionally the storage volume can incorporate a corresponding outlet.

With respect to the outlet, it is further provided that a filter is provided on or adjacently to the outlet, which is designed to filter out gaseous constituents of the insulating medium or the reaction products thereof.

In other words, it is provided that a filter is provided on or adjacently to the outlet and thus in an outlet path of the outlet or of the switching device. The function of the filter is the filtering out of gaseous constituents of the insulating medium, or the reaction products thereof. In particular, the filter is intended to execute the selective retention of fluorinated constituents or the reaction products thereof, for example by absorption or adsorption, upon the passage of the insulating medium through the filter. The outlet can thus terminate in the surrounding environment, in order to permit the discharge of the medium exiting the filter into the environment.

This can be advantageous, on the grounds that $SF_6$-free insulating gases frequently operate with gas mixtures which are comprised of one or more carrier gases and special additive substances. The additive substances are, for example, fluorinated compounds, which influence the dielectric properties of the gas mixture in a specific manner. The carrier gases are generally mixtures, which are predominantly comprised of carbon dioxide, nitrogen and oxygen, in specific proportions. During the operation of devices, breakdown products are produced by discharge processes which are potentially toxic, and consequently cannot be released into the environment. Fluorinated compounds contained in gas mixtures can also be harmful to health, the environment or the climate, and consequently should not be permitted to enter the environment. It is thus advantageous that a solution should be proposed, by means of which these harmful components are retained in the event of the insulating medium passing through.

Those substances which pass through the filter are thus not harmful to the environment, or are at least significantly less harmful than fluorinated substances, such that a release of the insulating medium is possible in a simple manner. It is thus permitted that the mixture which is discharged from the filter can be released into the environment in an environment-friendly manner.

The switching device described thus provides a particularly simple option, for example in conjunction with an overhaul or servicing, or under other circumstances, for the removal or release of the insulating medium from the switching device.

In particular, it is possible for the insulating medium to be conducted through the filter in a simple manner, without the necessity for complex processes or equipment.

In particular, in the switching device described, it is not necessary for disposal to be executed by means of pressurized containers, in the manner which is known from the prior art. In this regard, according to solutions from the prior art, the filling gas of a switching device is pumped into a pressurized container and delivered to an appropriate disposal facility. Under specific circumstances, it is possible for gas to be scrubbed and reused.

Conversely, the solution according to the invention provides significant advantages. If the drainage of the switching device is required, it is no longer necessary for the insulating medium, particularly such as a gas, to be stored and transported in a pressurized container. Instead, the insulating medium can be released directly in situ, through the filter. The transport and disposal of a spent filter, for example in the form of a spent filter cartridge, involves substantially less complexity than the handling of a pressurized container.

For the drainage of the switching device, with respect to the insulating medium, it can further be preferred that a vacuum pump is provided on an outlet. It can thus be ensured that no residues of the insulating gas remain in the switching chamber or in the storage volume. Alternatively, this can be achieved by means of a port through which, for example, air or nitrogen can be introduced into the switching device, such that residues of the insulating medium are removed by a flushing process.

It can preferably be provided that the filter incorporates a material which is selected from the group comprised of activated carbon, aluminum oxide and a zeolite material. It has been established that the above-mentioned substances in particular can be appropriate for the retention, for example by absorption or adsorption, of environmentally harmful substances, particularly such as fluorinated substances or the reaction products thereof, which can be produced during a switching action in response to the high temperature of the arc, whilst allowing substances which are less harmful to the environment to pass through, such that the latter can be released into the environment. In particular, the above-mentioned materials can retain fluorine-based or fluorinated substances, whilst allowing, for example, oxygen and nitrogen to pass through. Moreover, the above-mentioned materials can filter out any reaction products, for example from fluorinated substances, thus permitting a particularly high degree of effectiveness. The above-mentioned materials can thus be employed, in an advantageous matter, for the fulfilment of the object of the present invention.

Moreover, the above-mentioned materials can also remain stable, and can execute their action, in the event of any pressure associated with a release of the insulating medium.

Finally, the above-mentioned materials are easily obtainable, and can thus be employed in a cost-effective manner.

Of the above-mentioned materials, activated carbon can be particularly advantageous, as this material can be sourced in a particularly cost-effective manner, and also poses no problems with respect to the subsequent disposal of the filter. Accordingly, activated carbon can be particularly appropriate for the problem-free release of the insulating medium into the environment, and can be cost-effectively replaced after use. Activated carbon permits the binding of fluorine-based substances, and of any decomposition products. Spent activated carbon can be transported under unpressurized conditions, and can be subject to disposal by combustion.

In the case of a zeolite, in a non-limiting manner, a material of this type can be present which is based, for example, upon $SiO_2/Al_2O_3$, and which optionally has a $SiO_2/Al_2O_3$ ratio ("modulus") of at least 80 and a pore diameter of 4 to 7 Å (0.4 to 0.7 nm).

The above-mentioned advantages can also be permitted if the filter is configured in the form of a membrane, particularly in the form of a semi-permeable membrane. By the provision of a membrane of this type, a particularly high degree of selectivity can be achieved, such that the membrane or filter can be matched to the respective specific field of application in a particularly adaptive manner. In particular, the membrane or filter can be adapted to the insulating medium and the constituents thereof in a particularly effective manner, and can further be adapted to any potentially occurring reaction products.

Appropriate membranes are, for example, polymer membranes, zeolite membranes, porous membranes and ceramic membranes, of the type which are known from the prior art.

Thus, by the employment of a membrane, a reliable and safe release of the insulating medium into the environment can be achieved.

It can moreover be preferred that the insulating medium is comprised of at least one fluoride-based or fluorinated component and synthetic air. In particular, in this configuration, particularly advantageous synergistic effects can be achieved by the employment of the corresponding insulating medium and the filter.

By the provision of a filter which, in the event of a release of the insulating medium, for example, retains fluorine-based compounds and, for example, any reaction products thereof, and only permits the passage of synthetic air, any discharge of environmentally harmful substances into the environment can be prevented. This is possible, for example, by means of the above-mentioned filter materials, and particularly by means of activated carbon. Moreover, on the grounds that the insulating medium, other than the fluorinated compound, contains only synthetic air by way of a constituent, substances which pass through the filter are entirely harmless to the environment. This applies particularly on the grounds that synthetic air is essentially comprised exclusively, for example to a proportion of ≥99% by weight, of oxygen and nitrogen only, which substances self-evidently have no negative effects.

Synthetic air can particularly be understood as a gas mixture which is comprised to a proportion of ≥99% by weight, for example to a proportion of ≥99.9% by weight, of oxygen and nitrogen only, wherein oxygen is present in a proportion of 20% by weight, with a tolerance margin of +/−5% by weight, the remainder is constituted by nitrogen, and up to 1% by weight, preferably up to 0.1% by weight, can be constituted by impurities.

In this configuration, it can further be provided that synthetic air is present in a proportion of ≥80% by weight to ≤95% by weight, wherein the remainder is constituted by fluorinated compounds, and up to 1% by weight, preferably up to 0.5% by weight can be constituted by impurities.

In particular, it can thus be prevented that, in the event of a release of the insulating medium through the filter, substances enter the environment which, for example, pass through a selective filter for fluorinated compounds, but which nevertheless have a damaging effect, such as, for example, carbon dioxide. Although this gas is known, for example, as a constituent of insulating media of this type, it can have negative environmental impacts associated with the greenhouse effect.

In particular, the fluorinated compound can comprise at least one of the following: a fluoroketone and a fluoronitrile. It has been shown that these compounds in particular, either in respective isolation or in combination, can function in a particularly effective and reliable manner as an insulating medium, but can be securely and effectively retained by a filter of the above-mentioned type, in the event of a release of the insulating medium. Accordingly, these substances can be employed in particular, in a particularly effective manner, as an insulating medium for an electrical switching device according to the present invention.

It can further be preferred that the filter is configured in the form of a replaceable cartridge. In this configuration, servicing or repair operations can be executed in a particularly simple and problem-free manner on the grounds that, not only is a release of the insulating medium possible in a simple manner, but also, further to a release of the insulating medium, the filter, which is configured in the form of a replaceable cartridge, can be replaced in a problem-free manner. This can be achieved, in a simple manner, by the removal of the spent filter and the fitting of a new filter or a new cartridge. A replaceable cartridge can particularly be characterized in that it is removable through the outlet, and a corresponding new cartridge can be arranged at the same position.

In particular, in this configuration, it is even possible, in a problem-free manner, further to a release of the insulating medium, that the electrical switching installation is provided with an insulating medium which differs from the released insulating medium. The replacement cartridge can thus be equipped, in a simple manner, with a different specific filter material, such that the filter, in turn, can be adapted to the specifically employed insulating medium in a particularly simple manner.

It can further be preferred that, in the direction of flow of the insulating medium which is to be released, upstream or downstream of the filter, a cooling path is provided for the condensation of at least one gaseous component of the insulating medium. It can thus be advantageous that, in addition to the above-mentioned filter, the gas stream is further conducted through a cold trap or a condenser. Constituents of the gas mixture can thus be separated, which have a higher boiling point or sublimation point than the carrier gas mixture. This generally applies to fluorine-based substances. In principle, an option is thus provided for the processing and reuse of substances which are separated by this method.

It can thus be particularly advantageous that, in the direction of flow of the insulating medium, the latter firstly traverses the cooling path, and thereafter the filter. A major proportion of substances to be separated can thus be collected in the cold trap or condenser and reused, while the filter is employed exclusively for the retention of substances to be removed which have passed through the cooling path.

Accordingly, in this configuration, a particularly high degree of effectiveness in the separation of fluorinated substances, or the reaction productions thereof, can be combined with a particularly cost-effective method.

With respect to further advantages and technical features of the switching device, reference is made to the description of the method, the figures and the description of the figures, and vice versa.

A further object of the present invention is a method for the release of a fluid insulating medium from a switching device, of the type described in detail above, comprising the following method steps:

a) Provision of a switching device of the above-mentioned type;

b) Conveyance of the insulating medium through the outlet, and thus through the filter; and c) Conveyance of the medium which exits the filter into the environment.

The method described herein thus permits the removal from a switching device of the insulating medium, particularly a gas mixture containing fluorine-based substances and/or the reaction products thereof, in a particularly simple manner. This method can thus be a constituent element, for example, of a servicing operation, an overhaul, or other processes in which the removal of the insulating medium from the switching device is required.

According to method step a), firstly, a switching device according to the above-mentioned description is provided. In this regard, reference is thus made to the statements set out above.

According to method step b), conveyance of the insulating medium through the outlet, and thus into the filter, is executed thereafter, including the conveyance of constituents of the insulating medium through the filter, wherein the latter, in the interests of simplicity, can also be described as the conveyance of the insulating medium through the filter. Accordingly, in this method step, the insulating medium is conducted through the filter, and thus through the outlet, such that corresponding environmentally harmful substances are retained by the filter.

As the insulating medium, and particularly the gas mixture in the switching device, is predominantly comprised of gases which are harmless and can be released into the environment, the method permits the separation of toxic, environmentally harmful or climatically damaging constituents by means of a scrubbing or filtering process. This is achieved by the conduction of the insulating medium through the filter, for example through an activated carbon filter. Gas scrubbing filter devices of this type are known from other fields and can be embodied, for example, in the form of filter units or replaceable filter cartridges.

For example, it can be provided that the insulating medium, prior to the passage thereof through the filter, passes through a cooling path, in order to permit, for example, the separation and optional reuse of a major proportion of substances which are to be separated. Thereafter, substances which have not been filtered out by the cooling path can be retained by the filter.

Further to the above, the method thus permits, in a simple manner, the execution of method step c), and thus the conveyance of the medium which exits the filter, particularly a gas, into the environment, and thus into the surroundings of the switching device. The medium exiting the filter is specifically the insulating medium, excluding filtered-out substances, and can be comprised, for example, of synthetic air. As a result, there are no significant impairments to the environment, as described in detail above.

With respect to further advantages and technical features of the method, reference is made to the description of the switching device, the figures and the description of the figures, and vice versa.

Further details, features and advantages of the subject matter of the invention proceed from the sub-claims, and from the following description of the figures and the associated examples.

BRIEF DESCRIPTION OF THE SEVERAL VIEWS OF THE DRAWING

FIG. 1 shows a schematic representation of a configuration of an electrical switching device according to the present invention; and FIG. 2 shows a schematic detailed view of a further configuration of an electrical switching device according to the present invention.

DETAILED DESCRIPTION OF THE INVENTION

FIG. 1 shows a schematic representation of a configuration of an electrical switching device 10. The function of the switching device 10 is the constitution and interruption of an electrical connection.

The switching device 10 has a switching chamber 12, in which two contact pieces 14, 16 are directly arranged, which are movable relative to one another for the execution of a switching action, as indicated by the arrows 18, 20. Correspondingly, the switching device 10 has two switching states. A first switching state is represented in FIG. 1, in which an electrical connection is constituted. In this switching state, the contact pieces 14, 16 are in mutual contact. In an unrepresented switching state, the contact pieces 14, 16 are separated from one another, such that an insulating clearance is present between the latter.

A fluid, and particularly a gaseous insulating medium 30 is further provided, which can preferably be present in the switching chamber 12, and which can surround the contact pieces 14, 16. The insulating medium 30 can be comprised, for example, of at least one fluorine-based compound and synthetic air, wherein the fluorine-based compound can comprise a fluoroketone or a fluoronitrile.

The switching chamber 12 incorporates an outlet 22, through which the insulating medium 30 can be released from the switching element 10. To this end, the outlet 22 has a valve 24, by means of which the outlet 22 can be opened or closed. A vacuum pump 44 is further represented, by means of which it can be ensured that no, or no significant quantity of insulating medium 30 remains in the switching device.

A storage volume 28 can further be provided, which is connectable to the switching chamber 12 via a valve 26. In this case, it can be provided that the insulating medium 30, additionally or alternatively to the switching chamber 12, is also present in the storage volume 28 and, for example, only flows into the switching chamber 12 in the event of a switching action, by the opening of the valve 26.

The storage volume 28 also incorporates an outlet 32, through which the insulating medium 30 can be released from the storage volume 28. To this end, the outlet 32 incorporates a valve 34, by means of which the outlet 32 can be opened or closed. A vacuum pump 44 is again represented in the outlet 32.

It is further represented that, on both the outlet 22 of the switching chamber 12 and on the outlet 32 of the storage volume 28, a filter 36, 38 which is configured, for example, in the form of a replaceable cartridge, is respectively provided. The filter 36, 38 is designed to filter out gaseous constituents of the insulating medium 30, or the reaction products thereof. In particular, the filter can selectively retain fluorine-based constituents, or the reaction products thereof, which can thus be absorbed or adsorbed.

In particular, the filter 36, 38 comprises activated carbon, aluminum oxide or a zeolite material. Alternatively, the filter 36, 38 can be configured in the form of a membrane.

A configuration of this type, for example in the event of a repair or an overhaul, permits the insulating medium 30 or the gas exiting the filter 36, 38 to be released into the environment 40 in a simple and environment-friendly manner.

FIG. 2 shows a detailed view of a further configuration of a switching device 10. The outlet 22 of the switching chamber 12, together with the valve 24, the vacuum pump 44 and the filter 36, is represented in detail. It is further represented that, in the direction of flow of the gaseous insulating medium 30 which is to be released, upstream of the filter 36, a cooling path 42 which is configured, for example, in the form of a cold trap or a condenser, is provided for the condensation of at least one gaseous component. This permits, for example, the separation in the cooling path 42 of a major proportion of substances which are to be separated, which can optionally be reused. Thereafter, substances which are not filtered out by the cooling path 42 can be retained by the filter 36.

The above-mentioned configuration according to FIG. 2 applies correspondingly to the outlet 32 of the storage volume 28.

The individual combinations of constituent elements and the features of the above-mentioned embodiments are exemplary; the replacement and substitution of this instruction with further instruction contained in the present publication, and in the publications cited, are also expressly considered. A person skilled in the art will be aware that variations, modifications and other embodiments, which are described herein, can likewise arise without departing from the concept of the invention and the scope of the invention.

Correspondingly, the above-mentioned description is exemplary, and is not to be considered by way of limitation. The inclusion of the term "comprises" in the claims does not exclude other constituents or steps. The indefinite article "a/an" does not exclude a plural meaning. The mere fact that specific measures are re-cited in mutually differing claims does not signify that a combination of these measures cannot be advantageously employed. The scope of the invention, and of the associated equivalents thereof, is defined in the following claims.

The invention claimed is:

1. An electrical switching device for constituting and interrupting an electrical connection, comprising:
   a switching chamber;
   two contact pieces disposed directly in said switching chamber or in an encapsulation housing disposed in said switching chamber and configured in a gas-tight manner vis-à-vis said switching chamber, said contact pieces being movable relative to one another for an execution of a switching action;

a fluid insulating medium disposed in said switching chamber or in a storage volume connected to said switching chamber, said switching chamber or said storage volume having an outlet for releasing said fluid insulating medium; and a filter disposed on or adjacently to said outlet and configured to filter out gaseous constituents of the fluid insulating medium or reaction products thereof, which are conveyed through said outlet, said filter configured for releasing said fluid insulating medium exiting said filter into an environment.

2. The switching device according to claim 1, wherein said filter has a material selected from the group consisting of activated carbon, aluminum oxide and a zeolite material.

3. The switching device according to claim 2, wherein said filter includes activated carbon.

4. The switching device according to claim 1, wherein said filter is configured in a form of a membrane.

5. The switching device according to claim 1, wherein said fluid insulating medium has at least one fluorinated compound and synthetic air.

6. The switching device according to claim 5, wherein the fluorinated compound has at least one of a fluoroketone or a fluoronitrile.

7. The switching device according to claim 1, wherein said filter is configured in a form of a replaceable cartridge.

8. The switching device according to claim 1, further comprising in a direction of flow of the fluid insulating medium which is to be released, upstream or downstream of said filter, a cooling path for a condensation of at least one gaseous component of the fluid insulating medium.

9. A method for releasing a fluid insulating medium from a switching device, which comprises the following method steps of:

a) providing the switching device to contain:

a switching chamber;

two contact pieces disposed directly in the switching chamber or in an encapsulation housing disposed in the switching chamber and configured in a gas-tight manner vis-à-vis the switching chamber, the contact pieces being movable relative to one another for an execution of a switching action;

the fluid insulating medium disposed in the switching chamber or in a storage volume connected to the switching chamber, the switching chamber or the storage volume having an outlet for releasing the fluid insulating medium; and a filter disposed on or adjacently to the outlet and configured to filter out gaseous constituents of the fluid insulating medium or reaction products thereof, which are conveyed through the outlet, the filter configured for releasing the fluid insulating medium exiting the filter into an environment;

b) conveying the fluid insulating medium through the outlet; and c) conveying the fluid insulating medium which exits the filter into the environment.

* * * * *